United States Patent
Colleoni (10) Patent No.: US 9,763,535 B2
(45) Date of Patent: Sep. 19, 2017

(54) BREWING ASSEMBLY FOR BREWED BEVERAGE VENDING MACHINES

(71) Applicant: N&W GLOBAL VENDING S.p.A., Valbrembo (IT)

(72) Inventor: Paolo Colleoni, San Pellegrino (IT)

(73) Assignee: N&W GLOBAL VENDING S.P.A., Via Roma (IT)

( * ) Notice: Subject to any disclaimer, the term of this patent is extended or adjusted under 35 U.S.C. 154(b) by 310 days.

(21) Appl. No.: 14/387,821

(22) PCT Filed: Mar. 29, 2013

(86) PCT No.: PCT/IB2013/052555
§ 371 (c)(1),
(2) Date: Sep. 24, 2014

(87) PCT Pub. No.: WO2013/144922
PCT Pub. Date: Oct. 3, 2013

(65) Prior Publication Data
US 2015/0059587 A1    Mar. 5, 2015

(30) Foreign Application Priority Data

Mar. 29, 2012   (IT) .............................. TO2012A0279

(51) Int. Cl.
  *A47J 31/40*    (2006.01)
  *A47J 31/36*    (2006.01)
(52) U.S. Cl.
  CPC ......... *A47J 31/407* (2013.01); *A47J 31/3628* (2013.01); *A47J 31/3633* (2013.01); *A47J 31/3638* (2013.01)
(58) Field of Classification Search
  CPC ................ A47J 31/3623; A47J 31/3628; A47J 31/3633; A47J 31/3676
(Continued)

(56) References Cited

U.S. PATENT DOCUMENTS 5,964,142 A * 10/1999  Tio ....................... A47J 31/3614
                                                  99/289 R
6,779,436 B2 * 8/2004             Guindulain
                           Vidondo ............... G07F 13/065
                                                  99/287
(Continued)

FOREIGN PATENT DOCUMENTS

EP            2241228      10/2010
WO     WO 2004/049878      6/2004
(Continued)

OTHER PUBLICATIONS

International Search Report and Written Opinion from International Application No. PCT/IB2013/052555 mailed Jun. 18, 2013.

*Primary Examiner* — Reginald L Alexander
(74) *Attorney, Agent, or Firm* — Dorsey & Whitney LLP (57) ABSTRACT

A brewing assembly, which has a brewing chamber having a first axis and for receiving a sealed capsule of brewing material; a sealing piston mounted to move along a second axis to and from a sealing position sealing the brewing chamber; a first unloading device movable along the brewing chamber to at least partly expel the capsule from the brewing chamber; a second unloading device movable with respect to the brewing chamber to engage the at least partly expelled capsule and unload it to the outside; and a brewing body, which defines the brewing chamber, supports the first unloading device, and is mounted to oscillate, about a third axis substantially perpendicular to the first and second axes, between a first position, in which the first and second axis coincide, and a second position, in which the first and second axis extend on opposite sides of the second unloading device.

10 Claims, 5 Drawing Sheets

(58) Field of Classification Search
USPC .................................... 99/289 R, 295, 302 P
See application file for complete search history.

(56) References Cited

U.S. PATENT DOCUMENTS

| | | | |
|---|---|---|---|
| 7,487,713 B2 * | 2/2009 | Magno ................ | A47J 31/3628 |
| | | | 99/289 R |
| 8,667,889 B2 * | 3/2014 | Blanchino ........... | A47J 31/3638 |
| | | | 99/289 R |

FOREIGN PATENT DOCUMENTS

| WO | WO 2009/007804 | 1/2009 |
|---|---|---|
| WO | WO 2009/016444 | 2/2009 |

* cited by examiner

BREWING ASSEMBLY FOR BREWED BEVERAGE VENDING MACHINES

TECHNICAL FIELD

The present invention relates to a brewing assembly for vending machines for producing brewed beverages, particularly but not exclusively coffee beverages, from brewing material in sealed capsules.

BACKGROUND ART

More specifically, the present invention relates to a brewing assembly of the type comprising a brewing chamber having a first axis and for receiving a sealed capsule of brewing material; first piercing means located inside the brewing chamber to pierce the bottom of the capsule; a sealing piston having a second axis, the sealing piston being mounted to move along the second axis to and from a sealing position fluidtight sealing the brewing chamber, and the second axis being fixed; second piercing means fitted to the sealing piston to pierce a sealing wall of the capsule; first unloading means movable along the brewing chamber and the first axis to at least partly expel the capsule from the brewing chamber; second unloading means movable with respect to the brewing chamber and crosswise to the first axis to engage and unload the at least partly expelled capsule to the outside; and first and second conduit means for feeding pressurized water to the brewing chamber and receiving a brewed beverage from the brewing chamber respectively.

Brewing assemblies of this type are used in small espresso coffee vending machines.

DISCLOSURE OF INVENTION

It is an object of the present invention to improve the brewing assembly described above, so it is suitable for use in brewed beverage vending machines.

According to the present invention, there is provided a brewing assembly as claimed in Claim 1 and preferably in any one of the Claims depending directly or indirectly on Claim 1.

BRIEF DESCRIPTION OF THE DRAWINGS

A non-limiting embodiment of the present invention will be described by way of example with reference to the attached drawings, in which.

BEST MODE FOR CARRYING OUT THE INVENTION

Figures 1, 2:
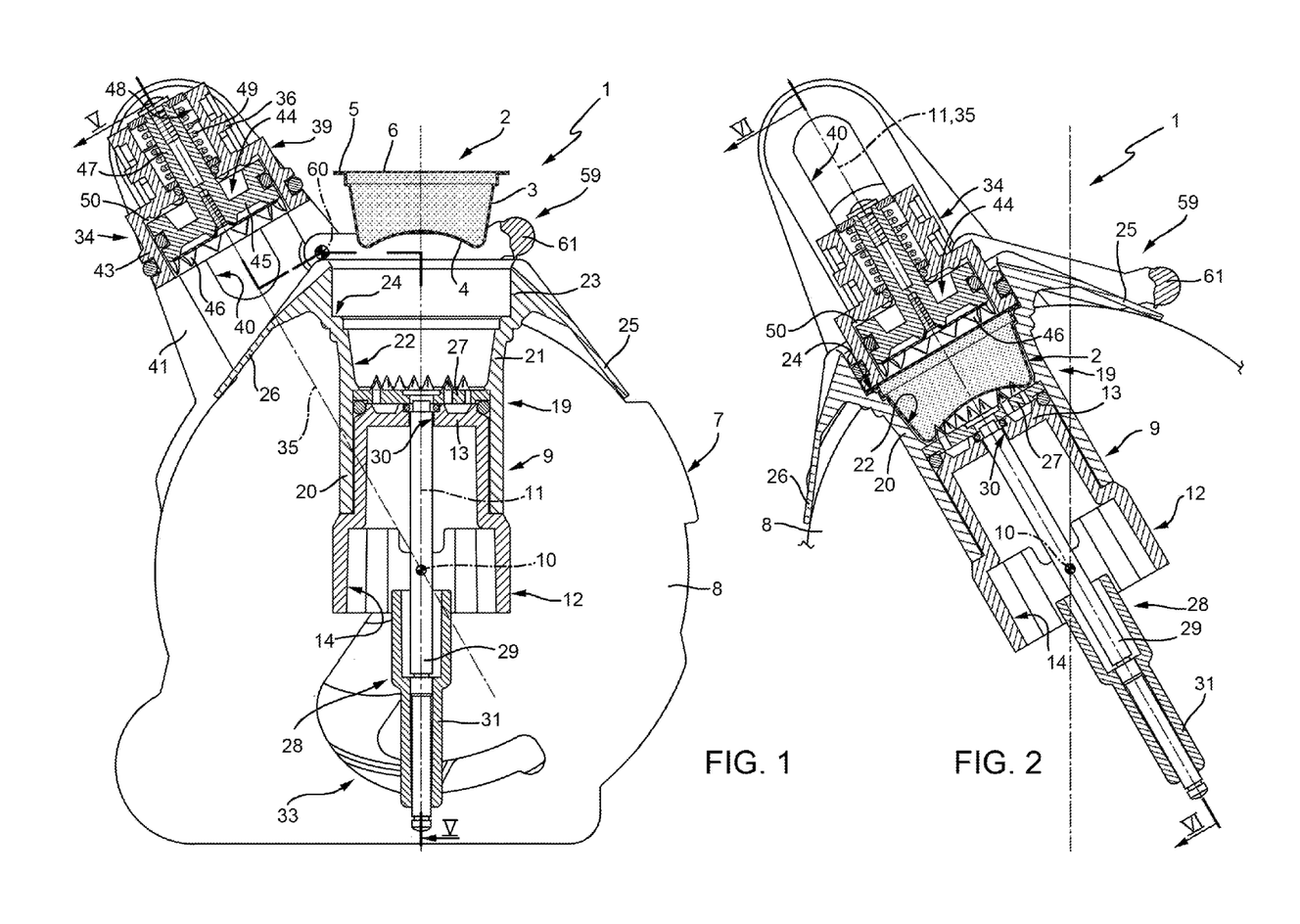
FIGS. 1 to 4 show sections of a preferred embodiment of the brewing assembly according to the present invention in respective operating configurations.

Number 1 in FIG. 1 indicates as a whole a brewing assembly for vending machines for producing brewed beverages, particularly but not exclusively coffee beverages, from brewing material in sealed capsules 2 of the type comprising a truncated-cone-shaped lateral wall 3 closed at one end by a concave bottom wall 4 and having, at the other end, an annular flange 5 supporting a sealing wall 6.

Brewing assembly 1 is largely similar to the one described in WO/2009/007804 and EP 2241228 filed by the Applicant, published on 15 Jan. 2009, and to which the reader is referred for a detailed description of most of its characteristics.

Figure 5:
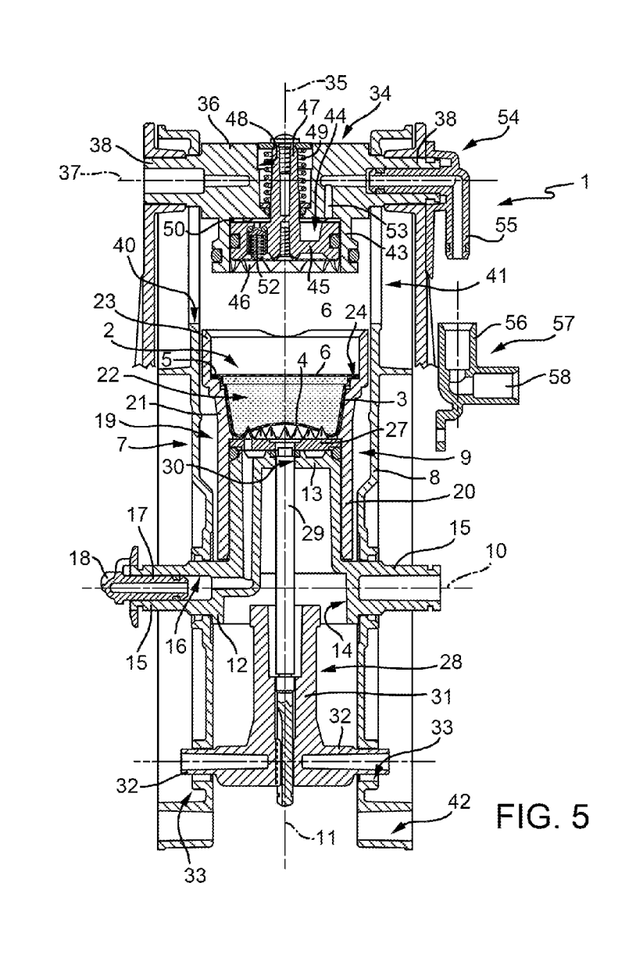
FIGS. 5 and 6 show sections along line V-V in FIG. 1 and line VI-VI in FIG. 2 respectively.
Figure 6:
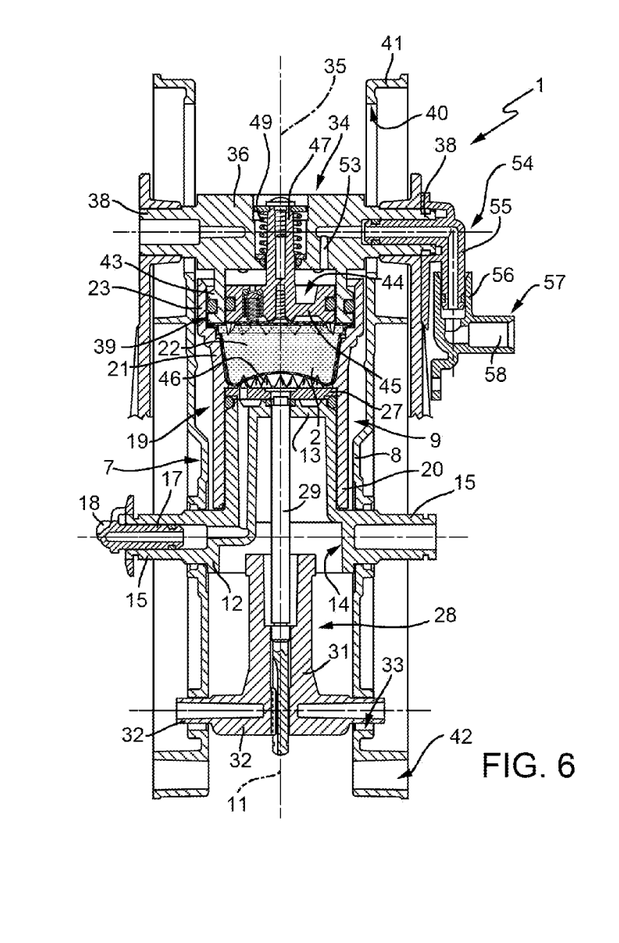

More specifically, brewing assembly 1 comprises a frame 7 defined by two vertical shoulders 8 (only one shown in FIGS. 1 to 4) integral with each other and spaced a given distance apart to define a space housing an elongated brewing body 9, which is mounted on shoulders 8 to oscillate, with respect to frame 7, about a horizontal axis 10 (FIGS. 5 and 6) perpendicular to shoulders 8.

Brewing body 9 has a longitudinal axis 11 perpendicular to axis 10, and comprises a bottom tubular body 12, which is coaxial with axis 11, is closed at the top by a wall 13 perpendicular to axis 11, has a bottom opening 14, and, on the outside at opening 14, has two tubular appendixes 15 coaxial with axis 10 and fitted in rotary manner to frame 7 to allow tubular body 12 to oscillate, in use, about axis 10. One of appendixes 15 communicates with a discharge conduit 16 formed along a lateral wall of tubular body 12 and through wall 13, and houses in fluidtight manner a tubular end insert 17 fitted, on its free end outside appendix 15, with a spout 18.

Brewing body 9 also comprises a top tubular body 19, a cylindrical bottom portion 20 of which is fitted to bottom tubular body 12, and a top portion of which comprises an upwardly-flared bottom part 21, which is coaxial with axis 11, is designed to house a capsule 2, and, together with wall 13, defines a brewing chamber 22; and a cylindrical top part 23, which is an access portion to brewing chamber 22, is coaxial with axis 11, is connected to a top edge of bottom part 21 by an annular shoulder 24 for supporting annular flange 5 of capsule 2, and is fitted on its free end with a sloping front plate 25 and a sloping rear plate 26.

Brewing body 9 also comprises a known piercing device 27 connected to the top surface of wall 13; and an ejector 28 comprising a rod 29, which is mounted to slide axially through a hole 30 formed through wall 13 and piercing device 27, and is fitted on its bottom end with a foot 31 mounted to slide through opening 14 and fitted with lateral cam followers 32, which engage a system 33 of fixed and powered movable control cams. System 33—for a detailed description of which the reader is referred to WO/2009/007804 and EP 2241228—is associated with shoulders 8, and provides for oscillating rod 29, and by means of rod 29 the whole of brewing body 9, about axis 10, as well as for moving rod 29 axially back and forth, with respect to brewing body 9, between a lowered rest position (FIGS. 1 to 3), in which the top end of rod 29 is on a level with piercing device 27, and a raised ejection position (FIG. 4), in which the top end of rod 29 is on a level with the free edge of top part 23.

The space between shoulders 8 also houses a sealing piston 34 having a fixed longitudinal axis 35 extending radially with respect to axis 10. Piston 34 comprises a top crosspiece 36, which has an axis 37 perpendicular to axis 35 and parallel to axis 10, and, at each end, a tubular appendix 38 coaxial with axis 37; and a cylindrical head 39 coaxial with axis 35 and of an outside diameter approximately equal to but no larger than the inside diameter of top part 23 of tubular body 19. Each tubular appendix 38 slides transversely, in angularly fixed manner, inside a respective guide slot 40 formed, parallel to axis 35, along a top appendix 41 of respective shoulder 8 to allow piston 34 to move back and forth, along axis 35 and radially with respect to axis 10, between a raised rest position (FIGS. 1 and 4) and a lowered work position (FIGS. 2 and 3) under the control of a powered cam system 42 (FIGS. 5 and 6) described in detail in WO/2009/007804 and EP 2241228.

Head 39 comprises a cylindrical tubular body 43 which projects downwards from crosspiece 36 and engages top part 23 of tubular body 19 in fluidtight manner with the interposition of a seal fitted to tubular body 43; and a piercing piston 44 which comprises a cylindrical head 45 having piercing pins 46 and mounted to slide in fluidtight manner along tubular body 43, and a rod 47 which is coaxial with axis 35 and slides in fluidtight manner inside a through hole 48 formed through crosspiece 36 and coaxial with axis 35. Rod 47 is suspended from crosspiece 36 with the interposition of a spring 49, which normally keeps head 45 in a raised rest position (FIGS. 1 and 4) housed entirely, together with piercing pins 46, inside tubular body 43, and which is compressible to allow head 45 to move downwards into an extracted position (FIGS. 2 and 3) in which piercing pins 46 project outwards of tubular body 43.

Head 45, tubular body 43, and crosspiece 36 together define an annular chamber 50, which communicates on one side with a conduit formed through head 45 and controlled by a valve 52 calibrated to open at a given pressure (4-5 bars), and communicates on the other side with a conduit 53 formed in crosspiece 36 and communicating with one of tubular appendixes 38. This tubular appendix 38 is engaged in fluidtight manner from the outside by a tubular arm of an L-shaped fitting 54, the other arm 55 of which is located outside relative shoulder 8 and projects downwards, parallel to axis 35 and coaxially with an arm 56 of a further L-shaped fitting 57 fitted in a fixed position to relative shoulder 8 and comprising a further arm extending outwards, parallel to axis 37, and defining a pressurized-water inlet 58.

Arm 55 is positioned so as to engage arm 56 in fluidtight manner when piston 34 is in the lowered work position, and to detach from arm 56 when piston 34 is in the raised position.

A passive doctor device 59 is mounted in the space between shoulders 8 to unload a used capsule 2 ejected from brewing chamber 22 by ejector 28.

Doctor device 59 is U-shaped, is hinged to shoulders 8, frontwards of piston 34, to oscillate about an axis 60 parallel to axis 10, and comprises an intermediate member defined by a doctor 61, which is parallel to axis 10, is positioned substantially tangent to the path travelled by the top end of brewing body 9 oscillating about axis 10, and is pushed by elastic means (not shown) to normally slide contacting said top end.

Operation of brewing assembly 1 is described in detail in EP 2241228, so will only be described briefly below, with particular reference to the effect on capsule 2 of the successive positions assumed by brewing body 9 in the course of a beverage-making cycle, and as of the FIG. 1 operating position, which is a loading position in which axis 11 is substantially vertical, top part 23 is located between axis 35 and doctor 61, ejector 28 is in the lowered rest position, and compression piston 34 and piercing piston 44 are in their respective raised rest positions.

Once capsule 2 is inserted, with bottom wall 4 facing downwards, into bottom part 20 of tubular body 19, so that annular flange 5 rests on annular shoulder 24, brewing body 9 is rotated (anticlockwise in FIGS. 1 and 2) about axis 10 to move brewing chamber 22 into a brewing position, in which axes 11 and 35 coincide and brewing chamber 22 is aligned with and positioned facing compression piston 34, which can be lowered (FIG. 2) into top part 23 of tubular body 19 to seal brewing chamber 22 and at the same time clamp annular flange 5 on annular shoulder 24. During this movement, piercing piston 44 remains stationary in the raised rest position with respect to compression piston 34.

The downward movement of piston 34 into top part 23 of tubular body 19 simultaneously moves fitting 54 (FIG. 6) down towards fitting 57 to connect arm 55 to arm 56; so, by the time compression piston 34 is fully lowered, annular chamber 50 communicates with inlet 58, and therefore with the incoming pressurized water, to lower piercing piston 44 and extract piercing pins 46 to pierce sealing wall 6 of capsule 2.

As piercing piston 44 is arrested in the extracted position contacting capsule 2, the pressure inside annular chamber 50 increases to open valve 52 and feed pressurized water into capsule 2, the bottom wall 4 of which deforms outwards and is pierced by piercing device 27, thus allowing the brewed beverage to flow out of capsule 2 and to the outside along tubular insert 17.

Figures 3, 4:
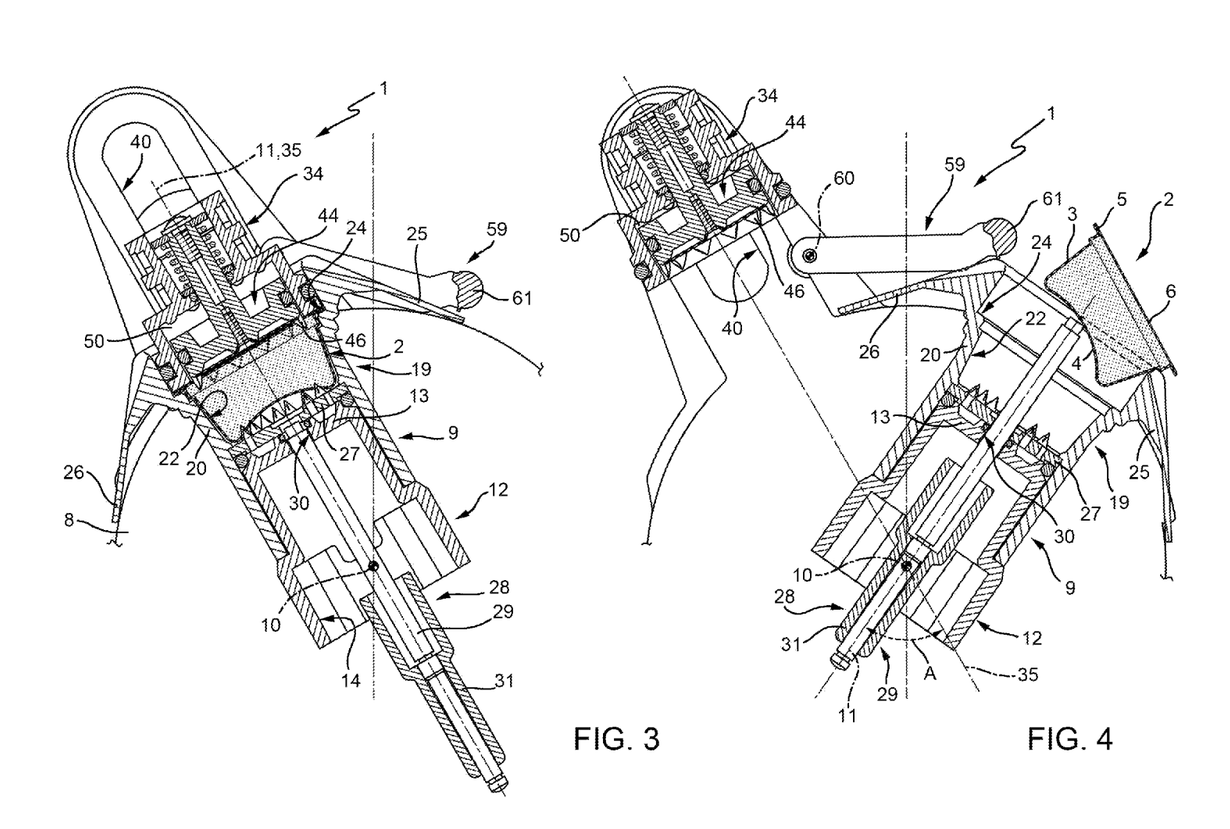

At this point, sealing piston 34 is extracted from brewing body 9, thus detaching arm 55 from arm 56, and brewing body 9 is rotated clockwise, in FIG. 3, to move axis 11 (FIG. 4) beyond doctor 61 into a position in which movable axis 11 forms with fixed axis 35 an angle A containing doctor device 59. This rotation of brewing body 9 about axis 10 is accompanied by a corresponding movement of ejector 28 into the raised ejection position, thus expelling the used capsule 2 partly from brewing chamber 22 and top part 23 of tubular body 19.

When brewing body 9 is next rotated (anticlockwise in FIG. 4) into the FIG. 1 loading position, with ejector 28 still in the raised ejection position, the used capsule 2 interferes with doctor 61, and is expelled completely and drops out of brewing body 9.

Figure 7:
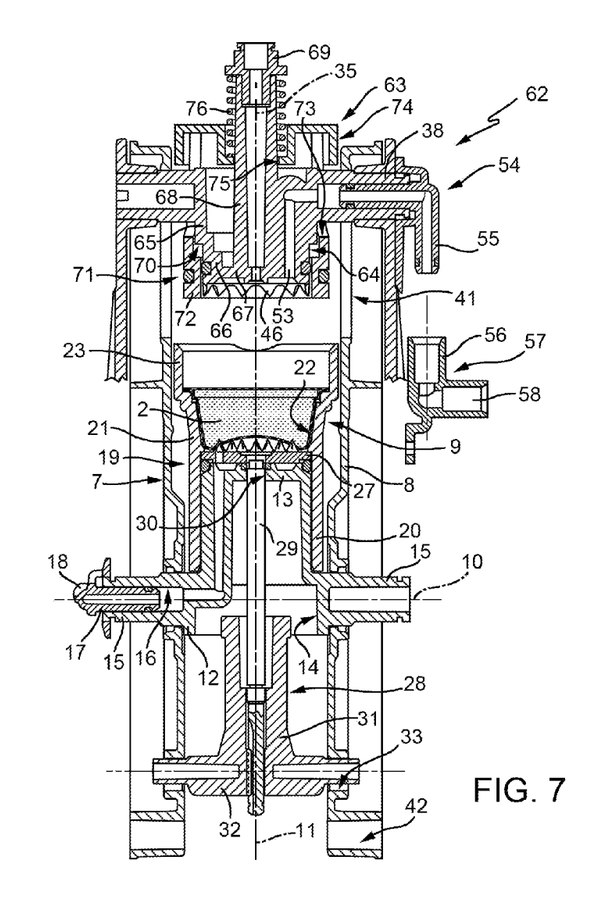
FIGS. 7 and 8 show the same sections as in FIGS. 5 and 6, of a first variation of the FIG. 1-4 brewing assembly.
Figure 8:
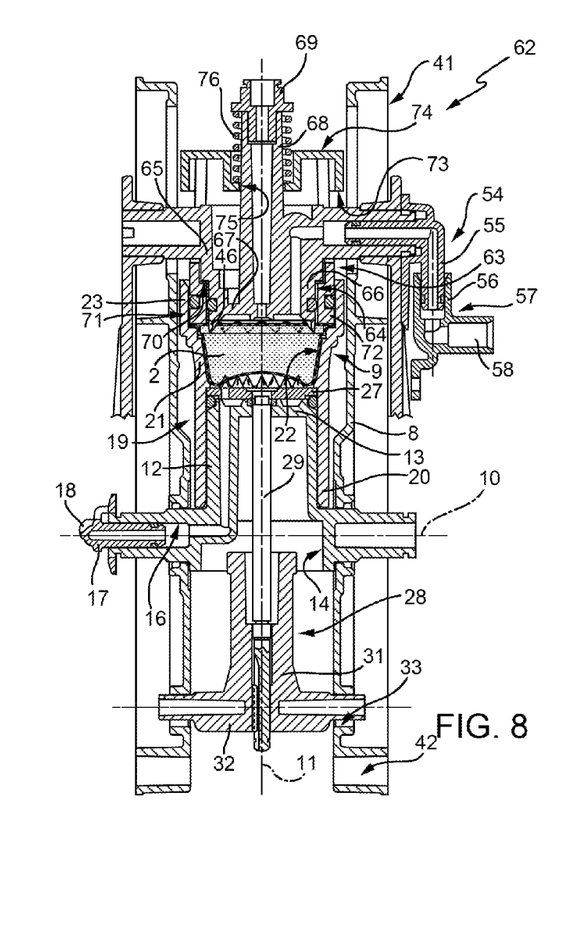

FIGS. 7 and 8 show a brewing assembly 62, which differs from brewing assembly 1 solely by comprising, instead of piston 34, a sealing piston 63, wherein piercing pins 46 are extracted mechanically, as opposed to hydraulically as in brewing assembly 1, and wherein any parts in common with piston 34 are indicated using the same reference numbers.

Like piston 34, piston 63 comprises a top crosspiece 36 extending along an axis 37 and having, at each end, a tubular appendix 38 coaxial with axis 37; and a cylindrical head 64 coaxial with an axis 35 of piston 63 and traversed by conduit 53. Each tubular appendix 38 slides transversely, in angularly fixed manner, inside a respective guide slot 40 formed, parallel to axis 35, along a top appendix 41 of respective shoulder 8 to allow piston 63 to move up and down, along axis 35 and radially with respect to axis 10, between a raised rest position (FIG. 7) and lowered work position (FIG. 8) under the control of a powered cam system 42 described in detail in WO/2009/007804 and EP 2241228.

Head 64 comprises a cylindrical top portion 65 extending through and projecting downwards from crosspiece 36; and a cup-shaped bottom portion 66, which is closed at the bottom by a bottom wall 67 fitted underneath with piercing pins 46 and supporting a tubular rod 68, which extends upwards from bottom wall 67, coaxially with axis 35, and has a top portion projecting upwards from crosspiece 36 and top portion 65, and closed at the top by a flanged cap 69. Bottom portion 66 comprises a cylindrical lateral wall, which is smaller in outside diameter than top portion 65, and is connected to top portion 65 by an annular shoulder 70.

Piston 63 also comprises a cylindrical sleeve 71 with an inner ring 72, which is substantially the same length as bottom portion 66, has an inside diameter approximating but no smaller than the outside diameter of the lateral wall of bottom portion 66, and engages in fluidtight sliding manner an outer surface of bottom portion 66.

Sleeve 71 has an outside diameter approximating but no larger than the inside diameter of top part 23 of tubular body 19, and has two axial slots 73, each engaged in transversely sliding manner by a respective tubular appendix 38 of crosspiece 36. Sleeve 71 extends above crosspiece 36, and is closed at the top by a circular cover 74, which is integral with sleeve 71, has a central hole 75 engaged in sliding manner by rod 68, and is normally held contacting crosspiece 36 by a spring 76 compressed between cover 74 and flanged cap 69.

As shown in FIG. 7, when piston 63 is in the raised rest position and cover 74 is positioned contacting crosspiece 36, sleeve 71 is in a lowered rest position in which ring 72 covers piercing pins 46. Conversely, when piston 63 is lowered, sleeve 71, still in the lowered rest position, engages top part 23 of tubular body 19 in fluidtight manner, and is interposition of annular flange 5). As piston 63 moves down further at this point, sleeve 71 slides upwards along bottom portion 66 of head 64 into a raised position in which ring 72 is arrested against annular shoulder 70 and, simultaneously, piercing pins 46 are extracted to pierce sealing wall 6 of capsule 2.

Figure 9:
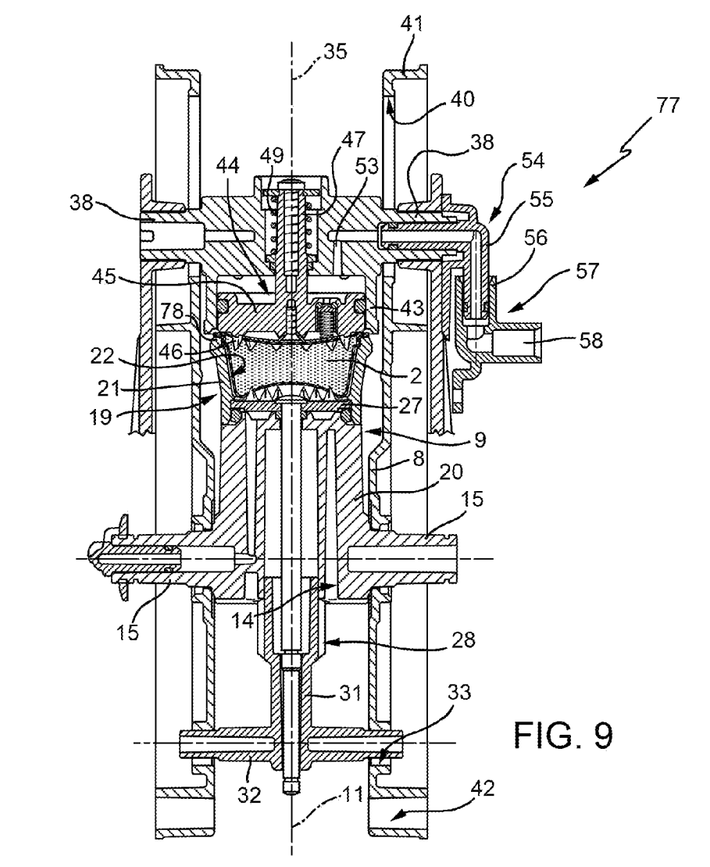
FIG. 9 shows the same section as in FIG. 6, of a second variation of the FIG. 1-4 brewing assembly.

FIG. 9 shows a brewing assembly 77, which differs from brewing assembly 1 solely by tubular body 19 of brewing body 9 having no top part 23, and by annular shoulder 24 being replaced by a free annular end edge 78 of bottom part 21.

In this variation, tubular body 43 also lacks the seal between cylindrical head 39 and cylindrical top part 23.

As shown in FIG. 9, when piston 34 is in the fully lowered position, the pressurized water entering annular chamber 50 moves head 45 of piercing piston 44 into the extracted position to pierce sealing wall 6 of capsule 2 and at the same time seal brewing chamber 22, by the periphery of head 45 engaging annular edge 78 of bottom part 21 in fluidtight manner, with the interposition of annular flange 5.

The invention claimed is:

1. A brewing assembly, comprising:
    a brewing chamber having a first axis, the brewing chamber for receiving a sealed capsule of brewing material;
    a piercing device located inside the brewing chamber to pierce a bottom of the sealed capsule;
    a sealing piston having a second axis, the sealing piston being mounted to move along the second axis to and from a sealing position fluidtight sealing the brewing chamber, wherein the second axis is a fixed axis;
    one or more piercing pins carried by the sealing piston to pierce a sealing wall of the sealed capsule;
    an ejector movable along the brewing chamber and the first axis to at least partly expel the sealed capsule from the brewing chamber;
    an unloading device movable with respect to the brewing chamber and crosswise to the first axis to engage the at least partly expelled sealed capsule and unload the at least partly expelled sealed capsule to the outside;
    first and second conduits for feeding pressurized water to the brewing chamber and for receiving a brewed beverage from the brewing chamber, respectively;
    a brewing body defining the brewing chamber and including the ejector; the brewing body mounted to oscillate, about a third axis substantially perpendicular to the first and second axes, between a first position in which the first and second axes substantially coincide with each other and a second position in which the first and second axes form an angle, the unloading device being located within the angle; and
    wherein the first conduit comprises a first portion movable with the sealing piston; and a fixed second portion substantially aligned with the first portion in a direction substantially parallel to the second axis; the first and the second portions being normally disconnected, and being mounted to connect to each other in fluidtight manner when the sealing piston is in the sealing position.

2. The brewing assembly as claimed in claim 1, wherein the first conduit extends at least partly through the sealing piston, and the second conduit extends through the brewing body.

3. The brewing assembly as claimed in claim 1, wherein the brewing body comprises a first tubular portion coaxial with the first axis, defining the brewing chamber, and for receiving the sealed capsule; and a second tubular portion coaxial with the first tubular portion, interposed between the first tubular portion and the sealing piston, and allowing access to the brewing chamber; the second tubular portion being engageable in fluidtight manner by the sealing piston.

4. The brewing assembly as claimed in claim 3, wherein the sealing piston comprises a tubular head coaxial with the second axis and which engages the second tubular portion of the brewing body in a fluidtight manner; and a piercing piston, which supports the one or more piercing pins, is mounted to slide in fluidtight manner along the tubular head, and is operated hydraulically to move along the second axis from a raised rest position in which the one or more piercing pins are housed inside the tubular head to an extracted position in which the one or more piercing pins project axially outwards of the tubular head towards the brewing body.

5. The brewing assembly as claimed in claim 3, wherein the sealing piston comprises a cylindrical head coaxial with the second axis and supporting the one or more piercing pins; and a cylindrical sleeve mounted to slide in fluidtight manner on the cylindrical head; the cylindrical sleeve being designed to engage the second tubular portion of the brewing body in fluidtight manner, and being movable, in opposition to elastic means, from a lowered rest position in which the one or more piercing pins are housed inside the sleeve, to a raised position in which the one or more piercing pins project axially outwards of the cylindrical sleeve towards the brewing body.

6. The brewing assembly as claimed in claim 1, wherein the brewing body comprises a tubular end portion facing the sealing piston, and which is coaxial with the first axis, defines the brewing chamber, and is designed to receive the sealed capsule; the tubular end portion having a free edge engageable frontally in fluidtight manner by the sealing piston.

7. The brewing assembly as claimed in claim 6, wherein the sealing piston comprises a tubular head coaxial with the second axis; and a piercing piston, which supports the one or more piercing pins, is mounted to slide in fluidtight manner along the tubular head, and is operated hydraulically to move along the second axis from a raised rest position in which the one or more piercing pins are housed inside the tubular head, to an extracted position in which the piercing piston engages the free edge of the tubular end portion frontally in fluidtight manner, and the one or more piercing pins project axially outwards of the tubular head towards the brewing body.

8. The brewing assembly as claimed in claim 1, wherein the ejector is movable back and forth along the brewing chamber.

9. The brewing assembly as claimed in claim 1, wherein the unloading device comprises a doctor positioned substantially tangent to a path travelled by the end of the brewing body facing the sealing piston.

10. A brewing assembly, comprising:
- a brewing chamber having a first axis, the brewing chamber for receiving a sealed capsule of brewing material;
- a piercing device located inside the brewing chamber to pierce a bottom of the sealed capsule;
- a sealing piston having a second axis, the sealing piston being mounted to move along the second axis to and from a sealing position fluidtight sealing the brewing chamber, wherein the second axis is a fixed axis;
- one or more piercing pins carried by the sealing piston to pierce a sealing wall of the sealed capsule;
- an ejector movable along the brewing chamber and the first axis to at least partly expel the sealed capsule from the brewing chamber;
- an unloading device movable with respect to the brewing chamber and crosswise to the first axis to engage the at least partly expelled sealed capsule and unload the at least partly expelled sealed capsule to the outside;
- first and second conduits for feeding pressurized water to the brewing chamber and for receiving a brewed beverage from the brewing chamber, respectively;
- a brewing body defining the brewing chamber and including the ejector; the brewing body mounted to oscillate, about a third axis substantially perpendicular to the first and second axes, between a first position in which the first and second axes substantially coincide with each other and a second position in which the first and second axes form an angle, the unloading device being located within the angle; and
- wherein the brewing body comprises a first tubular portion coaxial with the first axis, defining the brewing chamber, and for receiving the sealed capsule; and a second tubular portion coaxial with the first tubular portion, interposed between the first tubular portion and the sealing piston, and allowing access to the brewing chamber; the second tubular portion being engageable in fluidtight manner by the sealing piston.

* * * * *